Jan. 21, 1964     A. D. PANNUTTI     3,118,462
PRESSURE METERING DISPENSER
Filed March 27, 1961
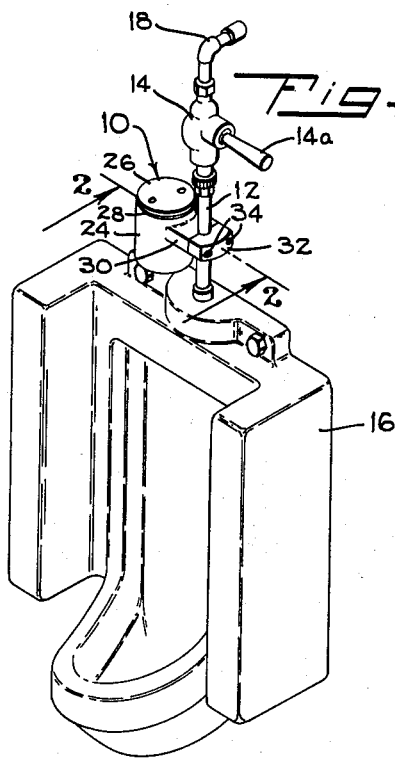
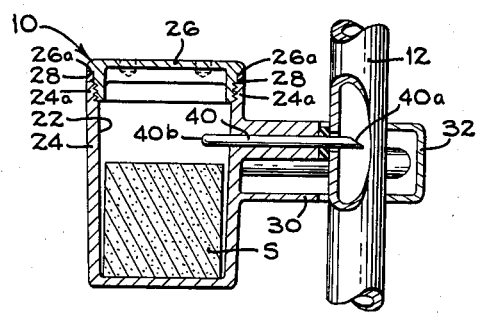
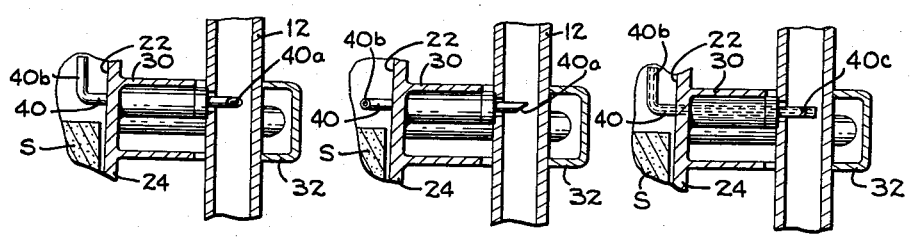
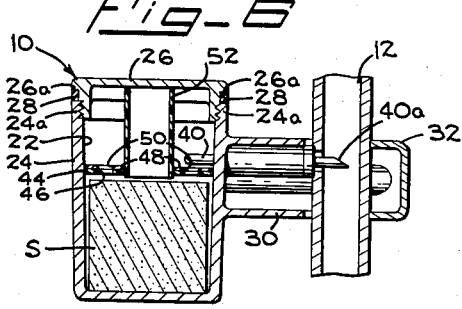
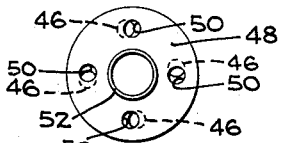
INVENTOR.
ANTONE DELANO PANNUTTI
BY *Paul B. Fike*
PATENT AGENT

United States Patent Office 3,118,462
Patented Jan. 21, 1964

3,118,462
PRESSURE METERING DISPENSER
Antone Delano Pannutti, 93 S. Autumn,
San Jose, Calif.
Filed Mar. 27, 1961, Ser. No. 98,551
6 Claims. (Cl. 137—268)

The present invention relates to a pressure metering dispenser adapted to dispense a substance in predetermined quantity into a liquid flow pipe automatically upon predetermined variation of pressure in such flow pipe, and more particularly relates to improvements in the pressure metering dispenser disclosed in my co-pending application, Serial Number 10,591, entitled, "Pressure Metering Dispenser," filed February 24, 1960, now abandoned.

A prime objective of dispensers of the type to which the present invention appertains is the assurance that a controlled amount of material will be dispensed upon the occurence of each dispensing cycle. It has been found as a practical matter during installation of pressure metering dispensers of the type described in my previous application that existent variances in water pressure, supply pipe sizes, and other parameters have necessitated somewhat tedious and time consuming installation procedures to assure that the desired amount of material will be dispensed during each dispensing cycle.

Accordingly, it is a general object of the present invention to provide an improved pressure metering dispenser that incorporates means for facilitating initial adjustment during installation and subsequent readjustment after installation as required to assure the controlled dispensing of a metered amount of material.

More specifically, it is a feature of the invention to provide means for readily adjusting the amount of material to be dispensed from a pressure metering dispenser easily and without the use of special tools.

Additionally, it is a feature to provide means for adjusting not only the amount of material to be dispensed during each dispensing cycle, but also the precise time during such cycle when the material is dispensed.

Yet another feature of the invention is the provision of a first control or adjustment means with which the amount and time of dispensing can be established, and a secondary control or adjustment means which serves somewhat after the fashion of a vernier adjustment to thus provide a fine setting of the amount of the material dispensed upon the occasion of each dispensing cycle.

These as well as other objects and features of the invention will become more apparent from a perusal of the following description of the structure illustrated in the accompanying drawing wherein:

FIG. 1 is a perspective view of a generally conventional urinal installation including a manual flushing valve and a pressure metering dispenser embodying the present invention, FIG. 2 is an enlarged central sectional view taken along line 2—2 of FIG. 1 illustrating interior details of the pressure metering dispenser and its connection to the water pipe, and more particularly showing the dispensing control or adjustment means in one particular setting, FIGS. 3 and 4 are each fragmentary, sectional views showing portions of the structure illustrated in FIG. 2 but illustrating the control or adjustment means in alternative settings, FIG. 5 is a fragmentary, sectional view similar to FIGS. 3 and 4 but illustrating a slightly modified embodiment of the invention, FIG. 6 is a central, sectional veiw similar to FIG. 2 but illustrating another embodiment of the invention incorporating a fine adjustment or control means, and FIG. 7 is a transverse sectional view taken substantially along line 7—7 of FIG. 6.

With initial reference to FIG. 1, a pressure metering dispenser embodying the present invention and generally indicated at 10 is conected to the so-called tail pipe 12 which leads from a control valve 14 to a conventional wall type urinal structure 16. Water is, of course, supplied to the valve 14 from a suitable supply line 18; and, normally, manual actuation of the control valve lever 14a automatically provides for the flow of water through the valve 14 and the tail pipe 12 into the urinal 16 for a period of from 3 to 7 seconds after which the valve automatically closes until the lever is once again manually depressed.

The pressure metering dispenser 10 is generally arranged to dispense a predetermined amount of a substance into the urinal 16 through the tail pipe 12 to which it is connected in response to the pressure variations experienced as a result of the described opening and closing of the control valve 14. With additional reference to FIG. 2, the pressure metering dispenser 10 includes a generally cylindrical housing forming a sealed chamber 22 therewithin. Such housing includes a generally cup-shaped body 24 disposed in an upright position and with interior threads formed for a predetermined distance downwardly from its upper lip 24a, and a cover 26 which includes an integral, dependent, annular flange 26a which is exteriorly threaded for reception within the threaded interior of the body 24. A suitable gasket 28 is placed around the dependent flange 26a so as to engage sealingly the upper lip 24a of body 24 when the cover is threadedly inserted to its fullest extent as shown in FIG. 2, thus to provide the sealed chamber 22 within the housing but to allow access thereinto when desired.

From the side of the body 24, a support member 30 projects laterally and terminates in a recess that is adapted to partially encompass the tail pipe 12. A second support member 32 encompasses the diametrically opposite side of the pipe 12 and is fastened to the first member 30 by suitable screws 34 which serve to clamp the two support members against the pipe and thus firmly support the entire dispenser 10 thereon. Within the projecting support member 30, a narrow and relatively short conduit 40 is disposed to establish communication between the interior of the described, sealed chamber 22 and the interior of the tail pipe 12 which is laterally drilled for reception of such conduit as can readily be visualized by reference to FIG. 2. The conduit 40 is in the form of a generally cylindrical, hollow tubing that is supported for rotational adjustment within the support member 30, the support being such that rotation of the tubing is resisted by friction but such friction can be overcome when manual turning force is applied to the tubing. The end of the tubing 40 within the tail pipe 12 is diagonally severed, as indicated at 40a; wherefore it will be obvious, and can be readily understood by additional reference to FIGS. 3 and 4, that rotation of the tubing will effect a change in the disposition of the diagonally severed end 40a thereof. The other end of the tubing 40 within the sealed chamber 22 is bent rectangularly, as indicated at 40b, in a predetermined direction relative to the disposition of the diagonal severance at the tail pipe end of the tubing. More particularly, a plane defined by the central, straight section of tubing 40 and the rectangularly bent portion 40b thereof is disposed at right angles to a plane that symmertrically bisects the diagonally-severed end 40a of the tubing. Accordingly, if the diagonally-severed end 40a of the tubing 40 faces upwardly, as illustrated in FIG. 2, the rectangularly bent portion 40b of the tubing is substantially horizontally disposed; if the tubing 40 is rotated 90° so that the diagonally severed end 40a is directed to the side as shown in FIG. 3, the rectangularly bent portion 40b of the tubing will be directed upwardly; and finally, if the diagonally severed end 40a of the tubing is directed downwardly as shown in FIG. 4, the rectangularly bent end 40b of the tubing 40 will again be substantially horizontally disposed. By removal of the cover 26, manual access will be provided to the rectangularly bent end 40b of the tubing and enable easy manual adjustment of the rotative disposition of the tubing 40 for adjustment and control of the dispensing operation, as will become more apparent hereinafter.

As clearly illustrated in FIG. 2, the tubing 40 enters the sealed chamber 22 at an intermediate level, and a cylindrical slug of water soluble solid S, which constitutes the material to be dispensed, is disposed within the chamber below the level of the entering tubing. Normally, for the purposes herein specifically required, such solid S will constitute a mixture of a wetting agent, a sequestering agent, a deodorant, and perhaps a coloring material. These constituents and their amounts form no part of the present invention and thus will not be described in further detail.

Initial installation of the described pressure metering dispenser 10 is obviously an extremely simple procedure. A small hole is drilled into the side of the water tail pipe 12, and the first support member 30 with the attached body 24 is placed against the tail pipe with the projecting end of the tubing or conduit 40 entering the drilled hole and thereafter the second support member 32 is placed diametrically opposite the described body, and through application of the two screws 34, the assembly is completed.

With the cover 26 of the chamber 22 removed, the tubing 40 is manually set to a predetermined disposition which will depend generally on the water pressure of the particular installation, the size of the pipe 12 and, to some extent, the desires of the user. Having preliminary knowledge of these factors, the installer can make a preliminary setting of the tubing disposition, then replace the cover 26, and observe the results from several repeated flushing operations. Generally, if relatively low water pressures are encountered, settings approaching the tubing dispositions illustrated in FIGS. 2 and 4 will be required; whereas, as higher pressures are encountered, a roational adjustment of the tubing 40 to a position approaching that illustrated in FIG. 3 will be made. A brief résumé of the operation of the device in each of these three settings will indicate the general character of dispensing achieved and thus indicate how a particular adjustment of setting can best be achieved for any given conditions.

With specific reference to FIG. 2 wherein the diagonally-severed end 40a of the tubing 40 is directed upwardly and the rectangularly-bent end 40b within the sealed chamber 22 is directed substantially horizontally, it will be assumed that sufficient liquid has been placed within the sealed chamber so that its surface is level with the end of the tubing 40 therein and that atmospheric pressure exists above the liquid within such chamber. When the flushing cycle is now instigated, water will pass downwardly through the tail pipe 12 and a portion thereof will pass through the tubing 40 into the sealed chamber 22 to raise the liquid level therewithin. The amount of liquid so introduced into the sealed chamber 22 will be dependent upon three principal factors: the pressure encountered within the tail pipe 12 as a result of water flow therethrough; the precise disposition of the diagonal cut 40a at the end of the tubing 40; and finally, the volume within the sealed chamber 22 above the end of the tubing 40 therewithin. The first factor, the pressure of the water within the tail pipe 12, will be determined by the pressure of the water source and additionally, by the amount of restriction to flow of water within the tail pipe 12. An increase in either of these factors will increase the amount of water entering the sealed chamber 22 upon the occasion of each flushing operation, it being obvious that a pressure balance must be established at all times between the interior of the tail pipe at the diagonally-severed end 40a of the tubing, and the sealed chamber 22 since they are directly connected by the tubing 40. The volume within the sealed chamber 22 above the inner terminus of the tubing 40 is also pertinent to the establishment of this pressure balance, it being clear that an increase in volume within the sealed chamber above the inner terminus of the tubing 40 will allow more liquid to enter the sealed chamber 22 upon the occasion of each flushing operation before such pressure balance is established. Finally, since it is obvious that the diagonal severance of the end of the tubing 40 within the tail pipe 12 effects some deflection of the downwardly moving water laterally through the tubing and into the sealed chamber 22, as the disposition of this diagonal severance approaches the upwardly-directed disposition shown in FIG. 2, more liquid will be introduced into the sealed chamber 22 upon the occasion of each flushing cycle. Since the disposition of the diagonally severed end 40a of the tubing and the level of the horizontally-projecting inner end 40b of the tubing 40 within the sealed chamber 22 both operate to increase the amount of liquid entering the sealed chamber upon the occasion of each flushing cycle, it will be understood that the setting or adjustment illustrated in FIG. 2 is generally utilized where low water pressures are encountered and relatively slight restriction is experienced within the tail pipe 12. When such an adjusted setting has been made and the valve 14 is first depressed to instigate a flushing cycle, a certain amount of water will be directed from the tail pipe 12 into the sealed chamber 22 until the pressure balance is established and the water so moved into the sealed chamber will remain therewithin until the pressure drops within the tail pipe upon closing of the control valve. At this time, the water which initially entered the sealed chamber 22 will return into the tail pipe 12 as a dilute solution containing a predetermined amount of the soluble substance S and will thereafter pass downwardly through the tail pipe 12 into the urinal 16 itself. At least a portion of this dispensed dilute solution will remain in the urinal between flushing cycles so as to have a continuing deodorizing and/or disinfecting action.

As the existent water pressure becomes greater or the restrictions in the tail pipe 12 increase so that a larger pressure is encountered within the tail pipe during a flushing cycle, the tubing 40 is adjusted rotationally from the position illustrated in FIG. 2 to a disposition more nearly approximating that shown in FIG. 3. In such position where the end of the tubing within the tail pipe 12 is disposed so that the diagonal severance 40a is directed laterally, there will be no lateral deflection into the tubing 40 of the water passing downwardly through the tail pipe 12 and thus only the back pressure created within the tail pipe will effect entrance of the water into the sealed chamber 22. Furthermore, since the rectangularly bent end 40b of the tubing within the sealed chamber 22 is now directed upwardly so that it closely approaches the cover 26 of the sealed chamber, the build-up of pressure within the sealed chamber will be much more rapid since the air remaining above the inner end of the tubing is compressible and this volume of air is now extremely small. Accordingly, it will be obvious that the setting illustrated in FIG. 3 can only be used where very high water pressures are experienced or extreme restrictions exist in the tail pipe 12 downstream of the tubing 40.

The adjustment setting illustrated in FIG. 4 can be employed when somewhat lower water pressure is encountered but should be utilized primarily when the urinal 16 itself is not to contain a residual amount of the dispensed solution between flushing cycles. Explanation of this result can be readily understood by a brief description of the operation of the device when the FIG. 4 setting is utilized. Since the diagonally-severed end 40b of the tubing within the tail pipe 12 is now directed downwardly, the initial rush of water thereby upon instigation of a flushing cycle will effect a suction on the opening of the tubing 40 to thus decrease the pressure within the sealed chamber 22, whereupon as the flow of water through the tail pipe 12 slows, some of the water will be sucked through the tubing 40 into the sealed chamber 22 to reestablish an atmospheric pressure balance at the time that the flushing cycle is substantially complete. Thus, when the flushing cycle is complete, the liquid level within the sealed chamber 22 will be slightly above the inner, open end of the horizontally-projecting tubing 40. Therefore, upon the occurrence of the next flushing cycle, and the initial creation of suction at the diagonally-severed end 40a of the tubing within the tail pipe 12, some of this liquid will be drawn immediately from the sealed chamber 22 to reestablish atmospheric pressure therein and will pass with the water downwardly into the urinal 16 and will be flushed therewith. As the end of the flushing cycle approaches, some of the water will again be drawn into the now subatmospheric sealed chamber 22 and will there remain until the next flushing cycle. The residual water within the urinal 16 will contain substantially no dilute solution between flushing cycles.

It may be mentioned that if the tubing 40 is manually adjusted from the position shown in FIG. 4 towards the position shown in FIG. 3, the amount of the suction effect will decrease, so that at certain settings intermediate that of FIGS. 3 and 4, some of the dilute solution may be dispensed both at the beginning and at the end of the flushing cycle. It will thus be understood that not only can the amount of material dispensed be accurately controlled regardless of water pressures and other existent parameters of a system, but the timing of such dispensing can to a certain extent be also controlled by the simple structure described above and specifically illustrated in FIGS. 2, 3 and 4.

As has been implied, the structure illustrated in FIGS. 2, 3 and 4 constitutes but one embodiment of the invention and other structural arrangements can obviously be devised in accordance with the principles of the invention. As one example, the modified embodiment of the invention illustrated in FIG. 5 utilizes the same principle that rotational adjustment of the tubing 40 having some form of lateral opening will provide a dispensing control means. Generally, the structure in FIG. 5 is the same as that illustrated in FIGS. 2, 3, and 4 and like reference numerals are therefore applied. However, at the end of the tubing 40 within the tail pipe 12, the extremity of the tubing 40 is severed in a plane that is perpendicular to the longitudinal axis of the tubing and a diagonal slot 40c is cut in the tubing a short distance from the open end thereof but still within the tail pipe 12 and thus in the path of water passing downwardly through the latter. A plane bisecting this diagonal slot 40c is disposed perpendicularly to the plane defined by the straight and rectangularly-bent portions of the tubing 40 so that the general effect of this structure is similar in its operation to that described with regard to FIGS. 2, 3, and 4. The only operational difference is that since the diagonal slot 40c passes only partially through the tubing 40 and since the end of the tubing is open, the effects noted in the operation of the structure illustrated in FIGS. 2, 3, and 4 are merely lessened. Thus, the structure illustrated in FIG. 5 is of particular advantage when varied high pressures are encountered, and enables a rotational adjustment to be made which is not quite as critical. When high water pressures are encountered, an angular adjustment of the tubing as illustrated in FIGS. 2, 3, and 4 of no more than one degree will effect sizable differences in the amount of material dispensed; whereas if the FIG. 5 structure is used in such a high pressure system, an angular adjustment of approximately ten degrees will produce substantially an equivalent variation in the amount of material dispensed. Since in all other respects, the operation of the FIG. 5 structure is identical or very similar to the structure illustrated in FIGS. 2, 3, and 4, a detailed operational description thereof will not be repeated.

The critical nature of the adjustments of the structure illustrated in FIGS. 2, 3, and 4, have been mentioned, particularly where high water pressure conditions exist and in accordance with an additional aspect of the present invention, a secondary adjustment means can be incorporated in the described structure to serve as a fine or vernier-type adjustment to supplement the adjustment provided by manual rotation of the tubing 40. With additional reference to FIGS. 6 and 7 such vernier adjustment means operate through controlling fluid communication between the saturated solution that is formed by continued contact with the soluble solid S and the water that enters and is subsequently withdrawn from the sealed chamber 22 upon the occasion of each flushing cycle. Preferably, as shown in FIG. 6, the body 24 is of internal, tapered, cylindrical configuration and a first disc 44 is placed therewithin; such disc having an external diameter substantially equivalent to the diameter of the frusto-conical interior wall of the chamber 22 at an intermediate position immediately above the solid material S. As shown in FIG. 7, this disc has four apertures 46 therein and rotatably supports thereabove a second disc 48 which has four similar apertures 50 that through rotation of the upper disc can be brought more or less into registry with the openings 46 in the lower fixed disc. A central cylindrical handle 52 is secured to the upper disc 48 so that when the cover 26 of the chamber 22 is removed, rotative adjustment of the upper disc 48 can be made to a position, such as for example that illustrated in FIG. 7, to thus in effect control the size of the openings between the upper and lower compartments of the chamber 22 that are defined by the interposed discs 44, 48. If the discs are aligned so that their holes are in precise registry, maximum fluid communication between the upper and lower compartments within the sealed chamber 22 is established and a maximum amount of solute can thus be transferred into the water injected into the upper portion of the sealed chamber 22 upon the occasion of a flushing cycle. On the other hand, if the upper disc 48 is rotated so that the openings are restricted, as illustrated in FIG. 7, less communication is established and a lesser amount of diffusion of the solute material into the water injected upon the occasion of each flushing cycle results so that an additional and fine control of the material dispensed can be achieved.

Various additional modifications and/or alternations can obviously be made without departing from the spirit of the present invention; and the foregoing description of several embodiments is to be considered as purely exemplary and not in a limiting sense. The actual scope of the invention is to be indicated only by reference to the appended claims.

What is claimed is:

1. A pressure metering dispenser for use with a flow pipe through which intermittent flow of liquid is established which comprises means forming a chamber having a substance to be dispensed therein, a short length of tubing terminating at one end in said chamber and adapted to terminate within the flow pipe at its remote end to establish fluid communication therebetween, and means for supporting said tubing for rotational adjustment about its own longitudinal axis, said tubing having a lateral opening within the flow pipe and being bent rectangularly adjacent its terminal end within said chamber.

2. A pressure metering dispenser according to claim 1 wherein the plane defined by the straight and rectangularly bent portions of said tubing is at right angles to the plane including the longitudinal axis of said tubing and substantially bisecting the lateral opening in said tubing within the flow pipe.

3. A pressure metering dispenser according to claim 2 wherein the plane including the rectangularly bent portion of said tubing is substantially vertical when the plane bisecting the opening is substantially horizontal.

4. A pressure metering dispenser for use with a pipe through which intermittent flow of liquid is established which comprises means forming a chamber having a substance to be dispensed therein, and a conduit adapted to connect the interior of the flow pipe and the interior of said chamber to establish fluid communication therebetween, and means supported at an intermediate level in said chamber for adjustably controlling fluid communication between compartments formed above and below said fluid-control means.

5. A pressure metering dispenser according to claim 4 wherein said controlling means includes a pair of discs supported at an intermediate level within said chamber, each disc having a plurality of similar openings therein, one of said discs being rotatable relative to the other of said discs to enable control of the effective size of the openings through the said discs.

6. A pressure metering dispenser according to claim 5 wherein said chamber has a frusto-conical interior wall and said discs have a diameter equivalent to the diameter of said chamber at an intermediate level therewithin.

UNITED STATES PATENTS

References Cited in the file of this patent

| | | |
|---|---|---|
| 690,337 | Willits | Dec. 31, 1901 |
| 1,447,289 | Farnham | Mar. 6, 1923 |
| 1,840,985 | Topper | Jan. 12, 1932 |
| 1,898,640 | Moss | Feb. 21, 1933 |
| 2,360,634 | Allen | Oct. 17, 1944 |
| 2,545,755 | Ward | Mar. 20, 1951 |
| 2,798,767 | Andrews | July 9, 1957 |
| 2,989,979 | Karlson | June 27, 1961 |

FOREIGN PATENTS

| | | |
|---|---|---|
| 271,217 | Great Britain | May 26, 1927 |